US012576762B2

(12) United States Patent (10) Patent No.: US 12,576,762 B2
Lingl et al. (45) Date of Patent: Mar. 17, 2026

(54) VEHICLE SEAT

(71) Applicant: GRAMMER Aktiengesellschaft,
Ursensollen (DE)

(72) Inventors: Sebastian Lingl, Hahnbach (DE);
Michael Niebauer, Oberviechtach
(DE); Roland Übelacker, Pfreimd (DE)

(73) Assignee: GRAMMER Aktiengesellschaft,
Ursensollen (DE)

( * ) Notice: Subject to any disclaimer, the term of this
patent is extended or adjusted under 35
U.S.C. 154(b) by 200 days.

(21) Appl. No.: 18/473,450

(22) Filed: Sep. 25, 2023

(65) Prior Publication Data

US 2024/0174149 A1     May 30, 2024

(30) Foreign Application Priority Data

Nov. 25, 2022    (DE) .................... 10 2022 131 303.4

(51) Int. Cl.
*B60N 2/02*        (2006.01)
*B60N 2/68*        (2006.01)
*B60N 2/70*        (2006.01)

(52) U.S. Cl.
CPC ........... B60N 2/682 (2013.01); B60N 2/0284
(2013.01); B60N 2/7094 (2013.01)

(58) Field of Classification Search
CPC ............................ B60N 2/0284; B60N 2/7094
See application file for complete search history.

(56) References Cited

U.S. PATENT DOCUMENTS 7,874,618 B2    1/2011  Kohl et al.
9,669,735 B2    6/2017  Singla Casasayas

FOREIGN PATENT DOCUMENTS

| AT | 348582 | | 2/1979 | |
| DE | 102007012728 | | 9/2008 | |
| DE | 102014204594 | | 9/2014 | |
| DE | 102013012291 | | 1/2015 | |
| DE | 102014118061 | A1 * | 3/2016 | ............. B60N 2/667 |
| DE | 102021201069 | | 8/2022 | |
| EP | 1946958 | A1 * | 7/2008 | .......... B60N 2/2209 |
| EP | 1970245 | | 9/2008 | |
| EP | 2583862 | | 4/2013 | |
| EP | 3085577 | | 10/2016 | |
| EP | 3643614 | | 4/2020 | |
| FR | 2981309 | | 4/2013 | |
| FR | 2981309 | A1 * | 4/2013 | .......... B60N 2/6671 |
| KR | 10-2020-0056843 | | 5/2020 | |
| WO | WO 2004/085197 | | 10/2004 | |

OTHER PUBLICATIONS

Official Action for Germany Patent Application No. 102022131303.
4, dated Mar. 2, 2023, 10 pages.
Extended European Search Report for Europe Patent Application
No. 23196339.8, dated Feb. 15, 2024, 6 pages.

* cited by examiner

*Primary Examiner* — Timothy J Brindley
(74) *Attorney, Agent, or Firm* — Sheridan Ross P.C.

(57) ABSTRACT

The invention relates to a vehicle seat comprising a base
frame including a seat portion frame and a backrest frame,
and a seat portion displaceable relative to the base frame.
The vehicle seat comprises a backrest member, wherein the
backrest member is being provided and adapted to be
detachably connectable to the backrest frame and the seat
part.

19 Claims, 10 Drawing Sheets

VEHICLE SEAT

CROSS REFERENCE TO RELATED APPLICATION

This application claims the benefit of German Patent Application No. 10 2022 131 303.4, filed Nov. 25, 2022, the contents of which are incorporated herein by reference in its entirety.

FIELD

The invention relates to a vehicle seat comprising a base frame, which comprises a seat part frame and a backrest frame, and a seat part displaceable relative to the base frame.

BACKGROUND

Such vehicle seats are sufficiently known from the prior art, which are designed in this way.

These vehicle seats may have a backrest upholstery which is connected to the backrest frame and may be adjustable, depending on the needs of the individual.

However, these backrest upholsteries are usually costly to replace or cannot be replaced at all, so that the entire vehicle seat must be replaced. This is often undesirable, particularly in the field of passenger transportation, because the confined space available makes it extremely complicated to replace a complete seat.

Likewise, these vehicle seats are difficult to assemble and, if necessary, extremely complicated to repair.

SUMMARY

Accordingly, it is the object of the present invention to overcome the disadvantages of the prior art. A vehicle seat is proposed which is of particularly simple construction so that the backrest upholstery is easily replaceable.

This task is solved by a vehicle seat with the features of claim 1.

A core idea of the invention is to provide a vehicle seat comprising a base frame, which comprises a seat part frame and a backrest frame, and a seat part displaceable relative to the base frame. It is provided that the vehicle seat comprises a backrest part, wherein the backrest part is provided and adapted to be detachably connectable to the backrest frame and the seat part.

According to the invention, the backrest part can be detached from the base frame of the vehicle seat and mounted thereon. This makes it possible to remove only the backrest part from the vehicle seat, so that the rest of the vehicle seat, in this case the base frame, does not have to be dismantled.

The backrest part is an assembly that is independent of the base frame and can be connected to it. The backrest part can therefore also be understood as a module of the vehicle seat.

According to a more advanced embodiment, it may additionally be provided that the seat part is detachably connected to the base frame, in particular the seat part frame. This makes it possible to detach both the backrest part and the seat part separately from the base frame in order to replace or clean them. Preferably, the seat part comprises a seat upholstery.

According to a further preferred embodiment, it may be provided that the backrest part comprises an upholstery frame with a backrest upholstery, preferably the upholstery frame being provided and adapted to be detachably connectable to the backrest frame.

Particularly preferably, the backrest upholstery is connected to the upholstery frame to form a relatively rigid structure which is accordingly easy to grip and carry.

Further preferably, the connection between two frame elements, namely the upholstery frame and the backrest frame, makes it possible to obtain an easy attachment between the frames due to the rigid design of the frames, since rotating of one of the frames cannot occur during assembly. Particularly preferably, the assembly or the connection between the upholstery frame and the backrest frame is further facilitated if the upholstery frame and the backrest frame are formed at least partially complementary to each other.

According to a more advanced embodiment, the comfort of the vehicle seat can be further increased by any embodiment if the backrest part comprises an adjustment possibility for changing a backrest inclination and/or a lumbar support. Accordingly, it may preferably be provided that the backrest part comprises a support part which is rotatably connected to the upholstery frame about a first axis of rotation and is detachably connected to the seat part the seat part, in order to further ensure easy detachability between the backrest part and the base frame.

The support part is a component of the backrest part and can be correspondingly removed from or arranged on the base frame together with the backrest part.

It may therefore be particularly preferred if the support part is provided and designed to deform a middle section of the backrest upholstery, the deformation being able to be brought about by means of a displacement of the seat part, a backrest inclination angle being adjustable by the deformation of the middle section.

Since the support part is, on the one hand, stationary with the upholstery frame except for rotation and, on the other hand, connected to the seat part, which is displaceable, the support part moves accordingly when the seat part is displaced. To be able to follow the displacement of the seat part in a correspondingly advantageous manner, it can be advantageously provided that the support part is designed to be at least partially deformable. In particular, the support part is provided and designed to be flexibly deformable.

By adjusting the backrest inclination angle, the lumbar support can be changed, for example, depending on the wishes of the person sitting on the vehicle seat.

Deformation of the backrest upholstery occurs because the support part is rotatably connected to the upholstery frame on the one hand and to the seat part on the other hand. By displacing the seat part, either forward or backward, the support part is moved along with the movement of the seat part. Since the support part is connected to the upholstery frame as described, the overall angle of the support part to the seat part or backrest frame or upholstery frame changes.

It is particularly preferred that in a non-displaced position the backrest angle is smaller than in a displaced position.

In the non-displaced position it can be understood that the seat part is in its rearmost position. With regard to the backrest inclination angle, this means that the backrest inclination angle has the smallest value that can be taken. Accordingly, a displaced position is any position which deviates from the non-displaced position, when, for example, the seat part is displaced forward.

A displacement of the seat part towards the seat part frame is preferably provided along a displacement direction. Particularly preferably, the displacement direction is a longitudinal direction of the vehicle seat. According to a preferred embodiment, it is provided that the seat part is translationally displaceable relative to the seat part frame exclusively.

Preferably, it is provided that the seat part can be displaced by an acting force, wherein the acting force is applied by a person sitting on the seat part. Such an acting force can act on the seat part by a shift of the person's weight or can be introduced into the seat part. This makes it particularly easy to move the seat part to suit the needs of the person sitting on the seat part.

According to a preferred embodiment, a guide means is provided by means of which the seat part can be guided in relation to the seat part frame. Particularly preferably, the guide means is designed in such a way that the seat part can be displaced in the direction of displacement.

According to a preferred embodiment, the guide means can be of particularly simple design if the guide means comprises sliding blocks and slots, the sliding blocks being formed at least partially complementary to the slots, so that the sliding blocks can be guided in the slots.

It can be provided that the sliding slots are connected, in particular firmly connected, to the seat part frame, and the slots are formed in the seat part. This can facilitate the assembly of the seat part. Alternatively, it would also be conceivable that the sliding slots are connected, in particular firmly connected, to the seat part, and the slots are formed in the seat part frame.

The guide means can be formed in a particularly simple and structurally advantageous manner if one of the sliding blocks or each sliding block comprises a first section, a second section and a third section, wherein the first section is arranged above the slot and is formed wider than the slot, and wherein the second section adjoins the first section and extends through the corresponding slot and a third section is arranged below the slot and adjoins the second section, wherein the third section is also formed wider than the slot.

The sliding slot thus preferably has a layered structure formed by the first section, the second section and the third section, which are arranged one above the other in a height direction. By the fact that preferably the second section can be guided in the slot and the first section and the third section are formed wider than the slot, a loosening of the sliding block and the slot can be prevented.

Particularly preferably, the slot or slots have a mounting portion which is configured and provided to allow the first portion to be guided through said mounting portion so that the second portion can then protrude through the slot. Preferably, the mounting section is dimensioned in such a way that the first section can be passed therethrough.

The slot is held in place by the first section and the third section, so that the sliding block can be well prevented from falling out of the slot.

Particularly preferably, the position of the assembly section or the displacement of the seat part is such that in an assembled state of the vehicle seat, meaning that the seat part is mounted on the seat part frame, the sliding block cannot be guided as far as the mounting section in order to be able to prevent the sliding block from falling out of the slot.

Particularly advantageously, according to a preferred embodiment, the falling out of a sliding block can be prevented and the displacement can be limited if a first end stop is arranged on the seat part and a bolt element is arranged on the seat part frame, which are provided and designed to interact with each other when the seat part is moved from the displaced position to the non-displaced position, wherein contact of the bolt element with the end stop defines the non-displaced position.

Further preferably, it is advantageous if the first end stop is arranged in front of the mounting portion in the displacement direction. That is, when the seat part is displaced to the home position, it is not possible to displace the seat part so far that the slot nut is arranged in the mounting section.

According to a further preferred embodiment, it may be provided that the backrest frame comprises a first upwardly extending backrest frame support and a second upwardly extending backrest frame support. Further preferably, the upholstery frame may comprise a first upwardly extending upholstery frame support and a second upwardly extending upholstery frame support. Still further preferably, it may be provided that the first upholstery frame support and the first upholstery frame support as well as the second upholstery frame support and the second upholstery frame support are fixedly connectable to each other in a lower region, but in particular are detachably connectable to each other.

Upward in this context may be in a vertical direction, for example along a vehicle seat height direction which is preferably perpendicular to the displacement direction.

In that the backrest frame and the upholstery frame each have supports, a particularly simple assembly of the frames in relation to one another can be ensured. Likewise, the stability of the frames can be increased.

A fixed but detachable connection can be achieved in this case by a screw connection or the like.

Particularly preferably, it can be provided that the lower ends of the upholstered frame supports, as seen in the vehicle seat height direction, can be connected to the backrest frame supports, in particular to lower ends of the backrest frame supports.

Furthermore, for further connection between the upholstery frame and the backrest frame, it may be provided that the upholstery frame can be suspended in corresponding recesses of the backrest frame or vice versa.

According to a preferred embodiment, the seat part frame and the backrest frame can enclose a fixed and unchangeable angle to each other for space-saving arrangement of the vehicle seat.

This can advantageously allow the angle of the person between the upper region of the back and the buttocks to remain unchanged, so that a further particularly advantageous adjustment in the lumbar region of the back is possible.

Particularly preferably, it is provided that the backrest frame and the seat part frame are detachably connectable or connected to each other, whereby further facilitated assembly and disassembly are possible.

According to a more advanced embodiment, it may be provided that the upholstery frame comprises a first cross strut to increase stability. Particularly preferably, the first cross strut is arranged between and connected to the upholstery frame supports.

Further preferably, it may be provided that the support part element is rotatably arranged at the first cross strut. The cross strut thus serves to arrange the support element in the backrest section. Particularly advantageously, the support part element is attached centrally to the first cross strut, whereby the support part element can already be provided for deforming the middle section of the backrest upholstery. In particular, the support part element is arranged at a distance from the upholstery frame supports so that contact between the support part element and the upholstery frame supports can be avoided when the seat part is displaced.

According to a preferred embodiment, the detachable connection of the backrest part to the seat part can be designed in such a way that the support part is connected to the seat part by means of a driver. Further preferably, the driver comprises a carrier element which is fixedly connected to the seat part. Particularly preferably, the driver is welded to the seat part or connected in a similar manner, although a detachable connection would also be conceivable.

Further preferably, it is provided that an engage element is arranged on the support part, which engage element is provided and designed to be connected to the driver element. In particular, the engage element can be designed in such a way that the driver element can engage in the engage element and thus a detachable connection can be formed by means of the connection unit.

According to a further preferred embodiment, it may be provided that the support part is at least partially made of a wire, in particular an elongated wire. This allows the support part to be manufactured inexpensively and in a material-saving manner.

In order to increase the stability and an elastic deformation of the support part, it may be provided according to a preferred embodiment that the support part has a plurality of meanders, so that the support part has a meandering structure.

To further facilitate fabrication of the support part, according to a further preferred embodiment it may be provided that the support part is formed of a first support part element and a second support part element, wherein the first support part element and the second support part element are connected to each other.

Particularly preferably, the support part elements are formed identically, so that the production effort can be further reduced.

Since the support part can be formed from two support part elements which are connected to one another, it is advantageously provided according to one embodiment that the support part elements are connected to one another by means of at least two connecting elements. Preferably, the connecting elements are connecting elements made of wire.

Further designs and configurations of the embodiments between them are applicable to the further embodiments and are freely combinable among each other, provided that they do not correspond to opposite embodiments. Features regarding the vehicle seat and the method of assembling the vehicle seat are usable in a corresponding manner.

Further advantageous embodiments result from the sub-claims.

The various embodiments with all their features can be combined and interchanged as desired.

All features disclosed in the application documents are claimed to be essential to the invention provided that they are new, individually or in combination, compared to the prior art.

The applicant reserves the right to claim all features disclosed in the application documents as essential to the invention, provided that they are individually or in combination new compared to the prior art. It is further pointed out that the individual figures also describe features which may be advantageous in themselves. The person skilled in the art recognizes immediately that a certain feature described in a figure can be advantageous even without adopting further features from this figure. Furthermore, the skilled person recognizes that advantages can also result from a combination of several features shown in individual figures or in different figures.

Further objectives, advantages and usefulness of the present invention are to be taken from the following description in connection with the drawings. Hereby shows:

DETAILED DESCRIPTION

In the figures, identical components are to be understood with the corresponding reference signs in each case. For the sake of clarity, components may not have a reference sign in some figures but have been designated elsewhere.

Figures 1A, 1B:
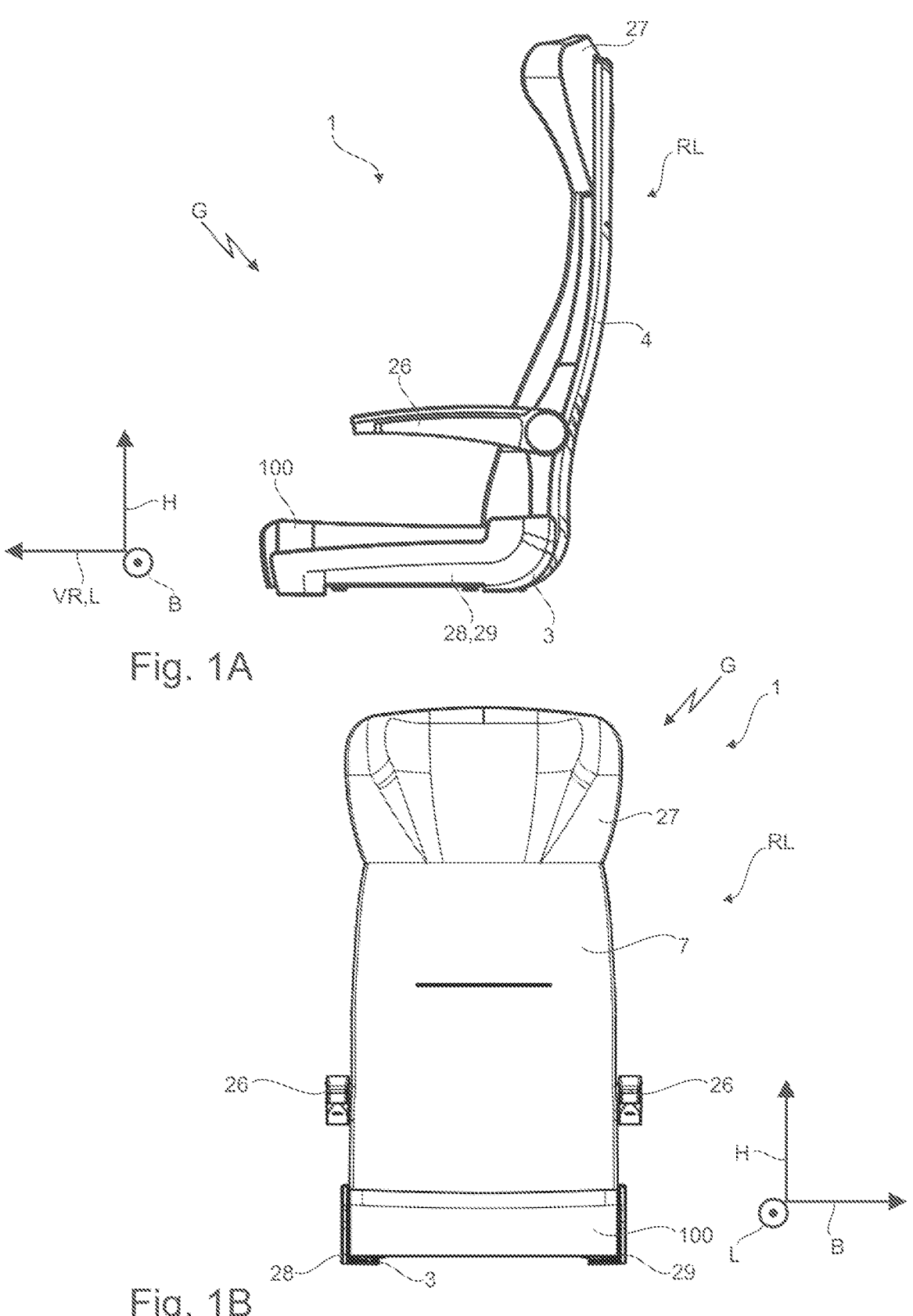
FIG. 1A a vehicle seat according to one embodiment in a side view.
FIG. 1B shows a front view of the vehicle seat according to FIG. 1A.

FIGS. 1A and 1B show a vehicle seat 1 according to the invention, the vehicle seat 1 being shown in a side view in FIGS. 1A and 1*n* a front view in FIG. 1B, in each case in a non-displaced position G.

Further, the vehicle seat 1 has a backrest RL with a backrest frame 4 and a backrest part 5 with a backrest upholstery 7. Further preferably, the vehicle seat 1 may include at least one armrest 26 pivotally connected to the backrest RL and a headrest 27. Further illustrated is a seat part frame 3. Also shown is a seat part 100. The seat part 100 may be displaced relative to the seat part frame 3, for example along a displacement direction VR which may correspond to a vehicle seat longitudinal direction L.

Furthermore, a vehicle seat height direction H and a vehicle seat width direction B are also shown.

Advantageously, a guide means can be provided by means of which the Seat part 3 can be guided relative to the Seat part frame 3. Particularly preferably, the guide means is designed in such a way that the seat part 100 can be displaced in the displacement direction VR.

Further preferably, a first cover element 28 and a second cover element 29 are shown, which are connected to the seat part frame 3, preferably detachably connected, and which cover the seat part frame 3 outwardly, so that it is not possible for fingers to interfere in the guide means and during displacement.

Figures 2A, 2B, 2C:
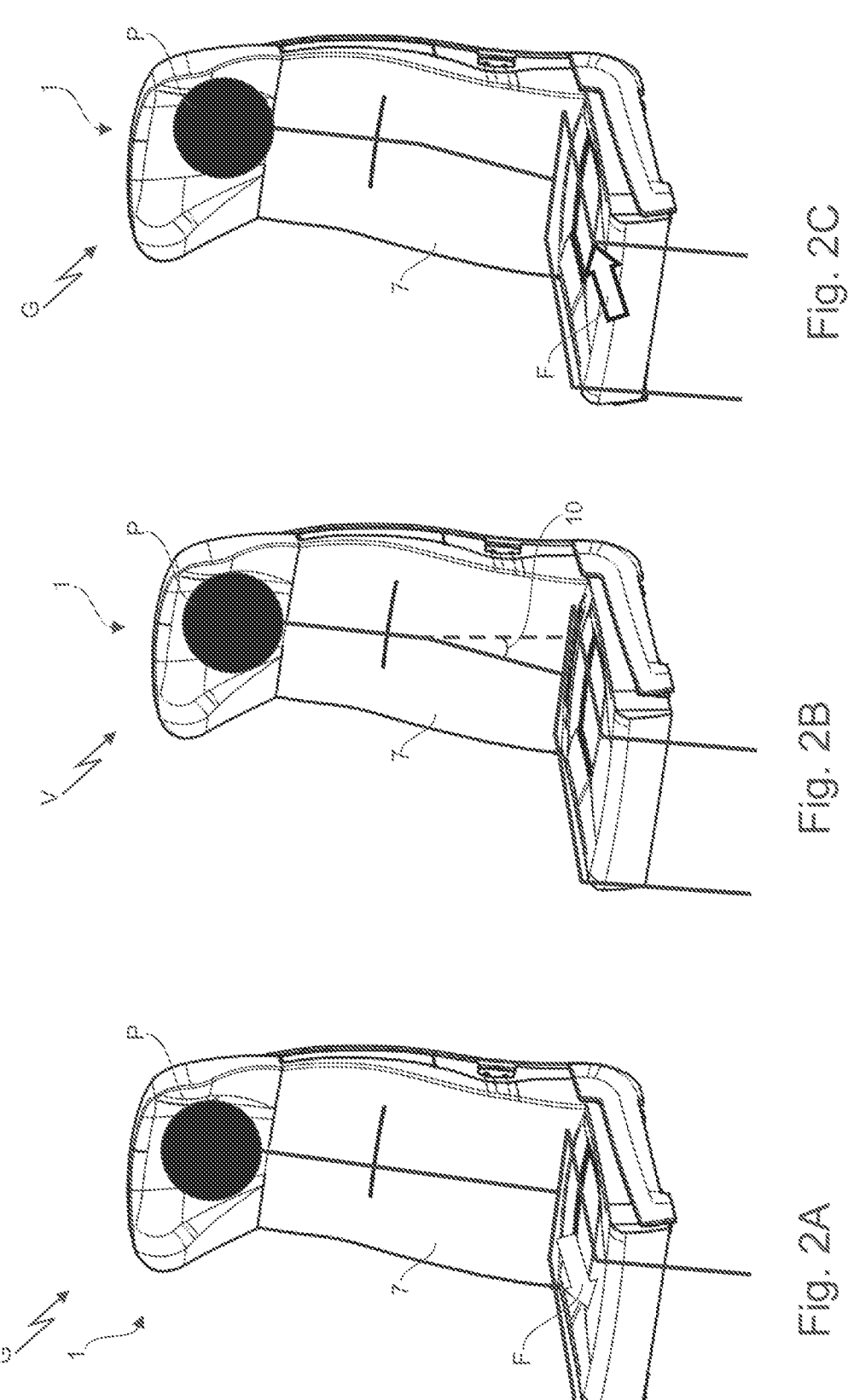
FIG. 2A-2C the operation of the vehicle seat according to FIG. 1A.

In FIGS. 2A to 2C, the functional principle is illustrated by means of schematic drawings.

A person P sits on the vehicle seat 1, more precisely the person P sits on the seat part 100. A force F acting on the seat part 100 can be applied by the person P to move the vehicle seat 1 from its current non-displaced position G to a displaced position V, which is shown in FIG. 2B. The seat part 100 is displaced in comparison with FIG. 2A.

For this purpose, the vehicle seat 1 can be designed and provided in such a way that the seat part 100 can be held in the displaced position V by a weight force of the person P sitting on the Seat part 100.

Likewise, the seat part 100 can be returned to the non-displaced position G by the person P, by means of corresponding force F. This is shown in FIG. 2C.

As can be seen particularly in FIG. 2B, by shifting the seat part 100 forward, the backrest upholstery 7 has changed with respect to a backrest inclination angle 10, which can be seen by the change in the sitting position of the person P. The seating position of the person P in the basic position G is schematically represented by a dashed line in the FIG. 2B.

Figure 3:
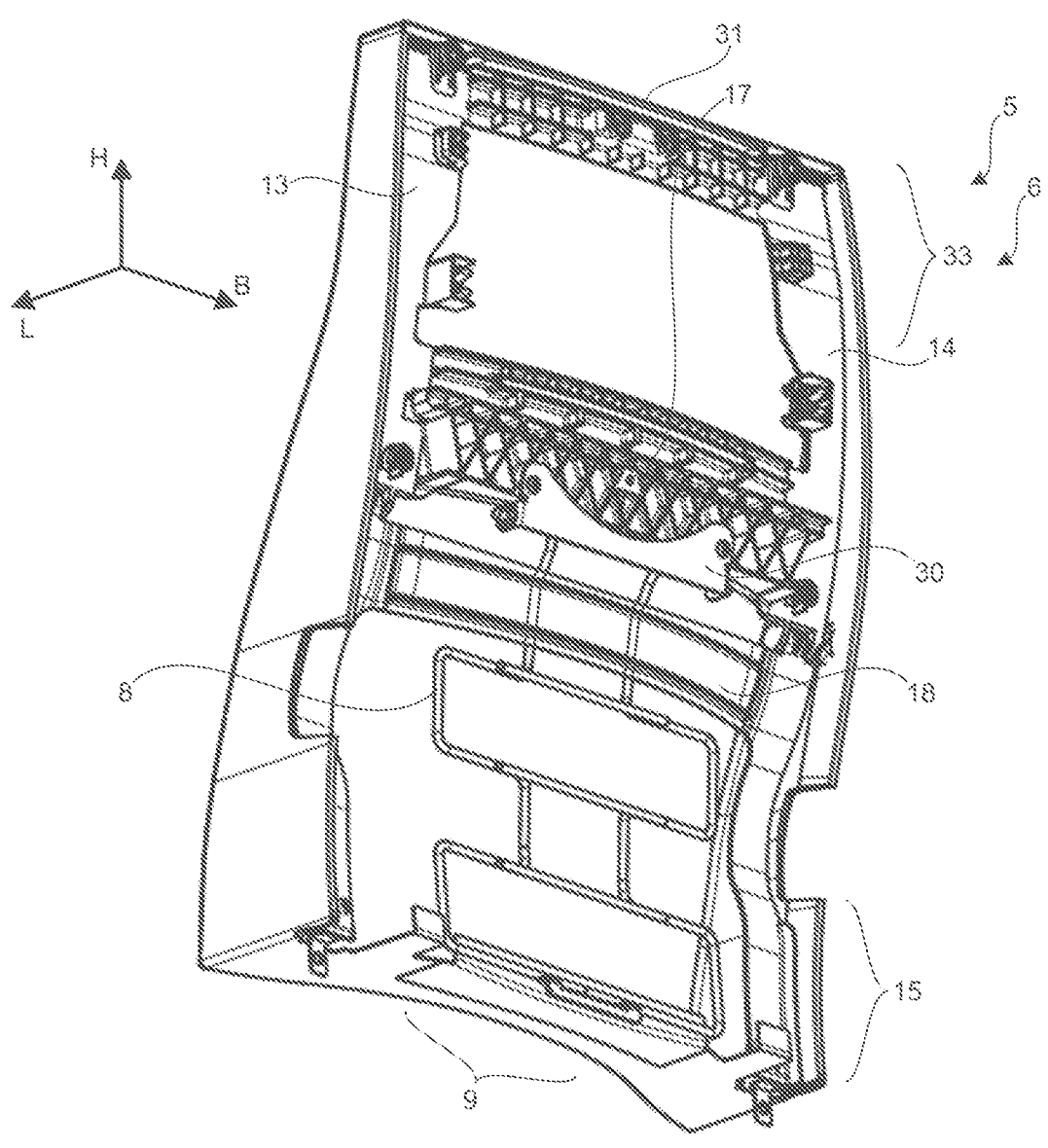
FIG. 3 a backrest part of the vehicle seat.

In FIG. 3, the backrest part 5 according to the invention is shown according to a preferred embodiment, whereby the backrest upholstery 7 is not shown for better clarity.

As can be seen, the upholstery frame 6 comprises a first upholstery frame support 13 and a second upholstery frame support 14, which extend in the vehicle seat height direction H.

In the present case, the upholstery frame supports 13, 14 are connected to one another by a first cross strut 17, the first cross strut 17 extending in the vehicle seat width direction B. A support part 8 is arranged on the first cross strut 17 so as to be rotatable about a first axis of rotation 32. Thereby, a receiving part 30 is further preferably provided, which is provided and formed for rotatably connecting the support part 8 to the first cross strut 17.

Likewise, a second cross strut 18 can be seen, which likewise connects the upholstery frame supports 13, 14 and extends in the vehicle seat width direction B. Preferably, the second cross strut 18 is arranged in front of the first cross strut 17 with respect to the longitudinal direction L of the vehicle seat. Likewise, the support part 8 is formed in such a way that the support part 8 is arranged in front of the first cross strut 17 and in front of the second cross strut 18, whereby the support part 8 cannot fall out of the backrest part 5 and can easily move toward the displacement direction VR and backwards.

The first cross strut 17 and the second cross strut 18 are arranged approximately centrally of the upholstery frame 6.

In addition, a third cross strut 31 is provided which connects the upholstery frame supports 13,14 to each other in an upper section 33 and extends in the vehicle seat width direction B.

A lower section 15 of the upholstery frame 6 is free of cross struts 17, 18, 31 which could otherwise hinder the movement of the support part 8 when the seat part 100 is displaced.

The lower section 15 and the upper section 33 refer to the vehicle seat height direction H.

The support part 8 is arranged in a middle section 9 of the upholstery frame 6, wherein the middle section 9 refers to the vehicle seat width direction B. More precisely, the middle section 9 is arranged between the upholstery frame supports 13, 14.

Figures 4A, 4B:
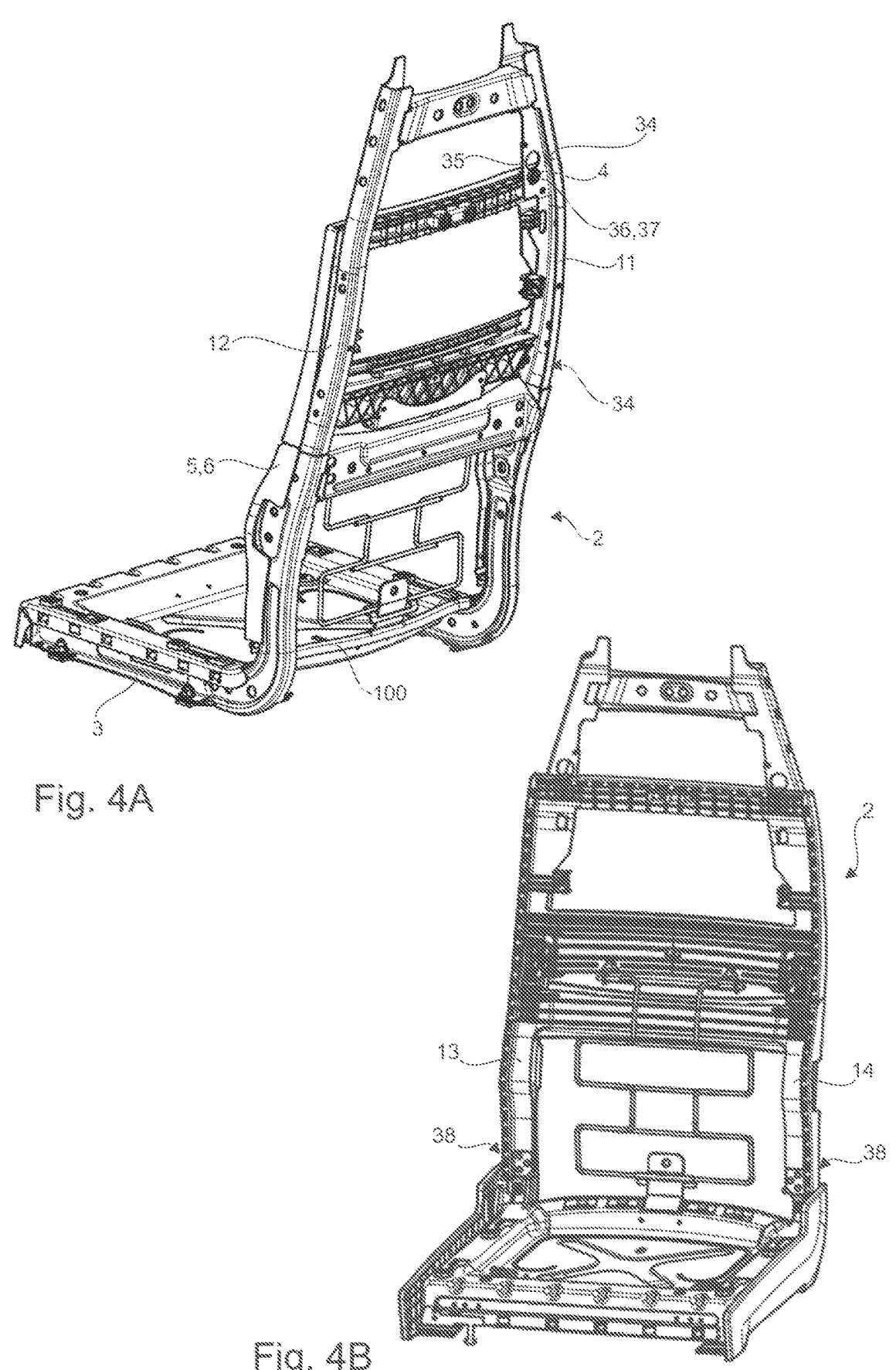
FIG. 4A-4B the vehicle seat with a base frame, a seat part and the backrest part.

FIGS. 4A and 4B show how the upholstery frame 6 is arranged with respect to the base frame 2. FIG. 4A shows a perspective view of the vehicle seat 1 from the rear and FIG. 4B shows a perspective view of the vehicle seat 1 from the front, in each case without upholstery elements.

As shown, the upholstery frame 6 can be connected to the backrest frame 4 by means of insert connectors 34, whereby preferably an upholstery frame support 13, 14 can be connected to a backrest support 11, 12. A insert connector 34 can be designed in such a way that it functions according to a "keyhole principle", that is to say that a larger opening 35 and a smaller opening 36 are provided, the larger opening 35 being larger than the smaller opening 36. A retaining means 37 of the upholstery frame 6 can be introduced into the larger opening 35 and hooked downwards into the smaller opening

36. For this purpose, the retaining means 37 is formed at least partially larger than the smaller opening 36.

It may be provided that the first backrest frame support 11 and the first upholstery frame support 13, as well as the second backrest frame support 12 and the second upholstery frame support 14, can be firmly connected to one another in the lower section 15, but in particular can be detachably connected to one another. This can be achieved by a corresponding connection 38, which in the present case is designed as a screw connection.

Figure 5A:
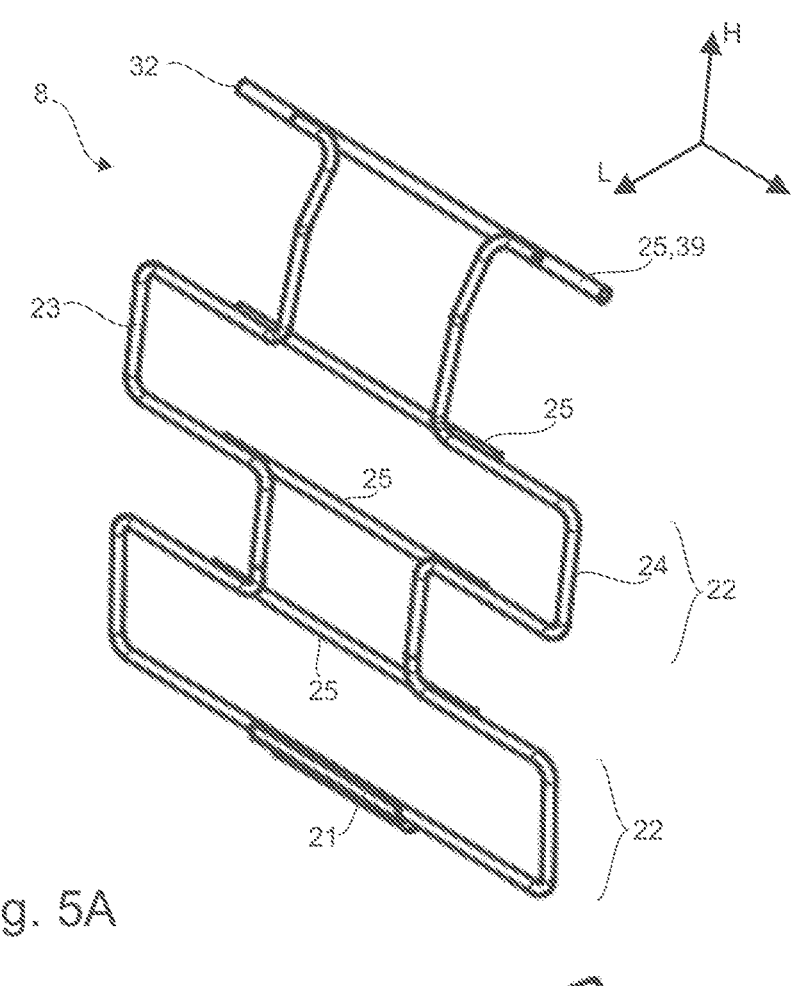
FIG. 5A-5B a support part element of the backrest part.
Figure 5B:
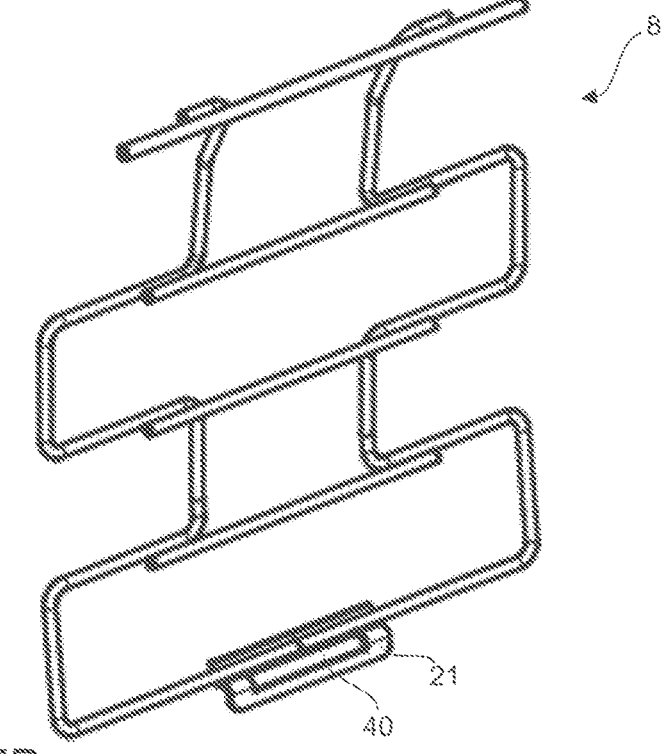

FIGS. 5A and 5B show the support part 8 according to one embodiment, wherein the support part 8 is shown from the front in FIG. 5A and from the rear in FIG. 5B.

The support part 8 comprises a first support part element 23 and a second support part element 24, which are connected to each other by means of connecting elements 25. One of the connecting elements 25, namely the uppermost connecting element 25, 39, is formed longer than the other connecting elements 25, so that this can be well connected to the receiving part 30, so that the uppermost connecting element 25, 39 forms the first axis of rotation 32.

The support part 8 is thereby such that it has a plurality of meanders 22.

The Support part 8 further comprises at its lower end an engage element 21, which is a part of the connecting element 19 and is configured to receive a driver element 20, so that the support part 8 can be or is connected to the seat part 100.

For this purpose, the engage element 21 has an opening 40 into which the driver element 20 can project in and out of.

Figure 6A:
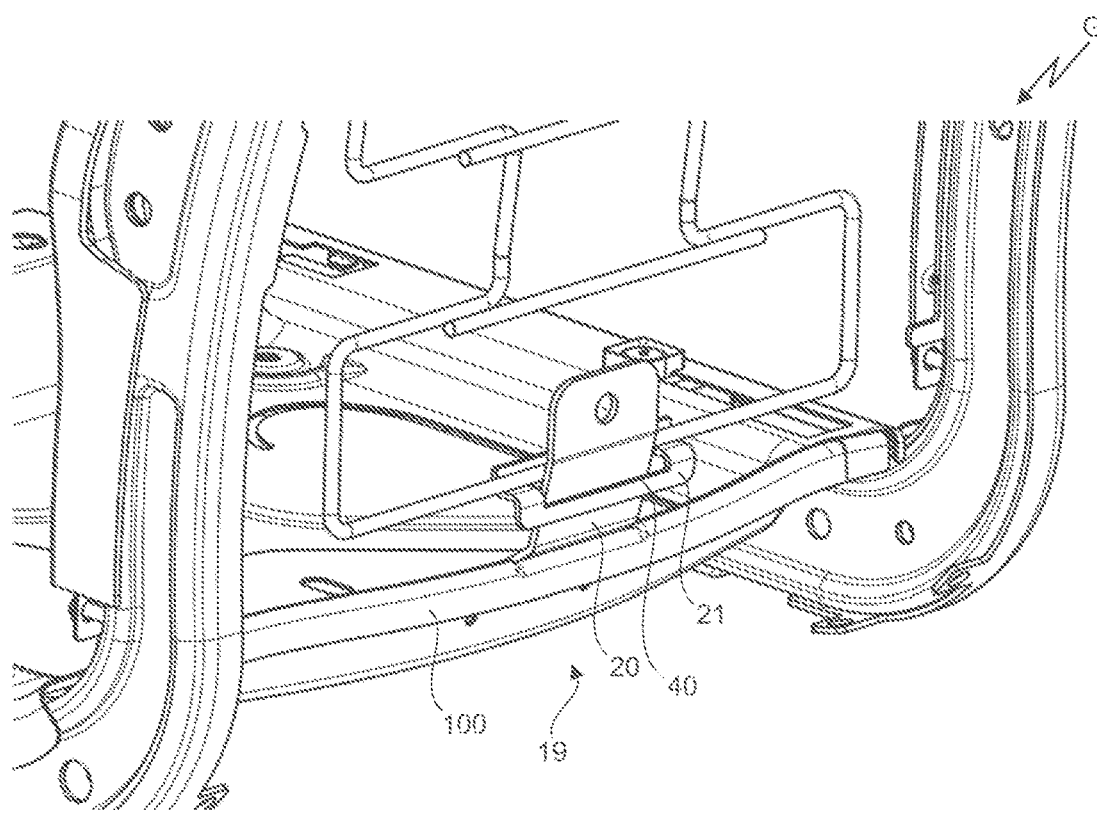
FIG. 6A-6B a connection of the support part element to a seat part.
Figure 6B:
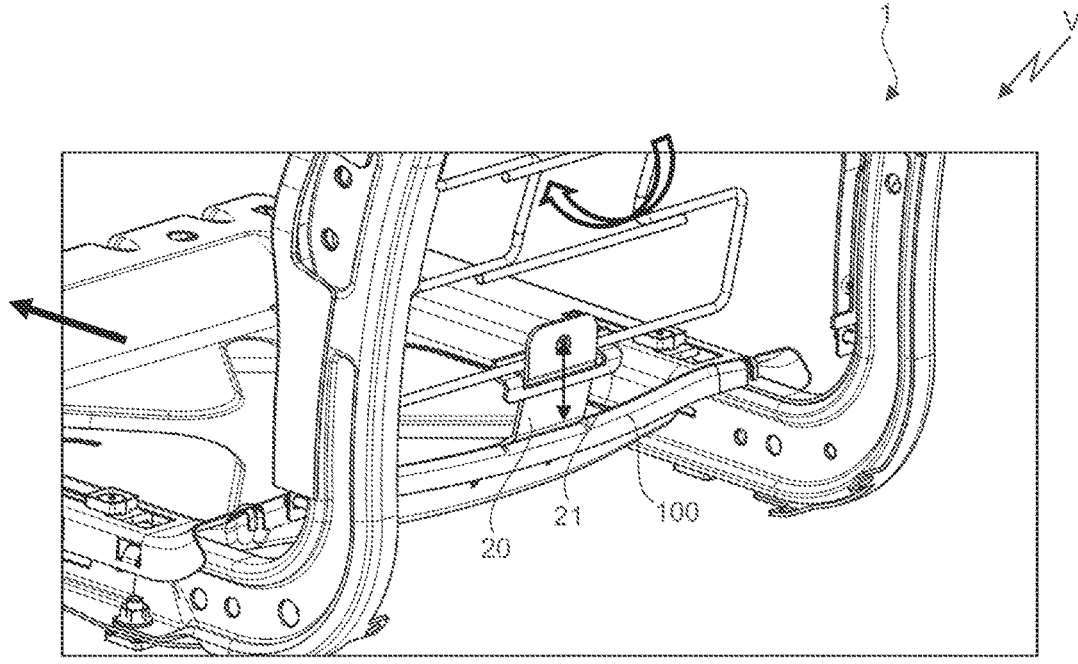

The connecting unit 19 comprising the engage element 21 and the driver element 20 are shown in more detail in FIGS. 6A and 6B. FIG. 6A shows the vehicle seat 1 in the non-displaced position G, FIG. 6B shows the vehicle seat 1 in the displaced position V or how the vehicle seat 1 is brought into the displaced position V.

As can be seen, the driver element 20 is inserted into the opening 40 of the engage element 21 and extends through the opening 40 from one side of the opening 40 and extends further on the further side of the opening 40.

By displacing the seat part 100 forwardly, as shown in FIG. 6B, the engaging element 20 moves in accordance with the displacement of the seat part 100 with the seat part 100 as they are connected to each other. As a result of this movement or displacement of the driver element 20, the engage element 21 moves accordingly. Since the engage element 21 is connected, in particular fixedly connected, to the support part 8, the engage element 21 experiences a corresponding movement. However, since the support part 8 is fixedly connected to the upholstery frame 6 except for rotation, the engage element 21 moves the support part 8 forward in the lower section of the support part 8 and thereby also upward in the vehicle seat height direction H. The engage element 21 causes the support part 8 to move forward in the lower section of the support part 8 and thus also upward in the vehicle seat height direction H. The engagement element 21 thus moves relative to the driver element 20 and is guided by the latter.

As a consequence of this movement, the support part 8 is moved along accordingly, whereby the middle section 9 of the backrest upholstery 7 is deformed accordingly by the deformation of the support part 8 likewise. The movement of the support part 8 as well as of the seat part 100 and of the driver element 20 in connection with the engage element 21 is shown in FIG. 6B by corresponding arrows. Particularly preferably, the support part 8 is designed to be deformable, in particular designed to be flexibly deformable.

Figures 7A, 7B:
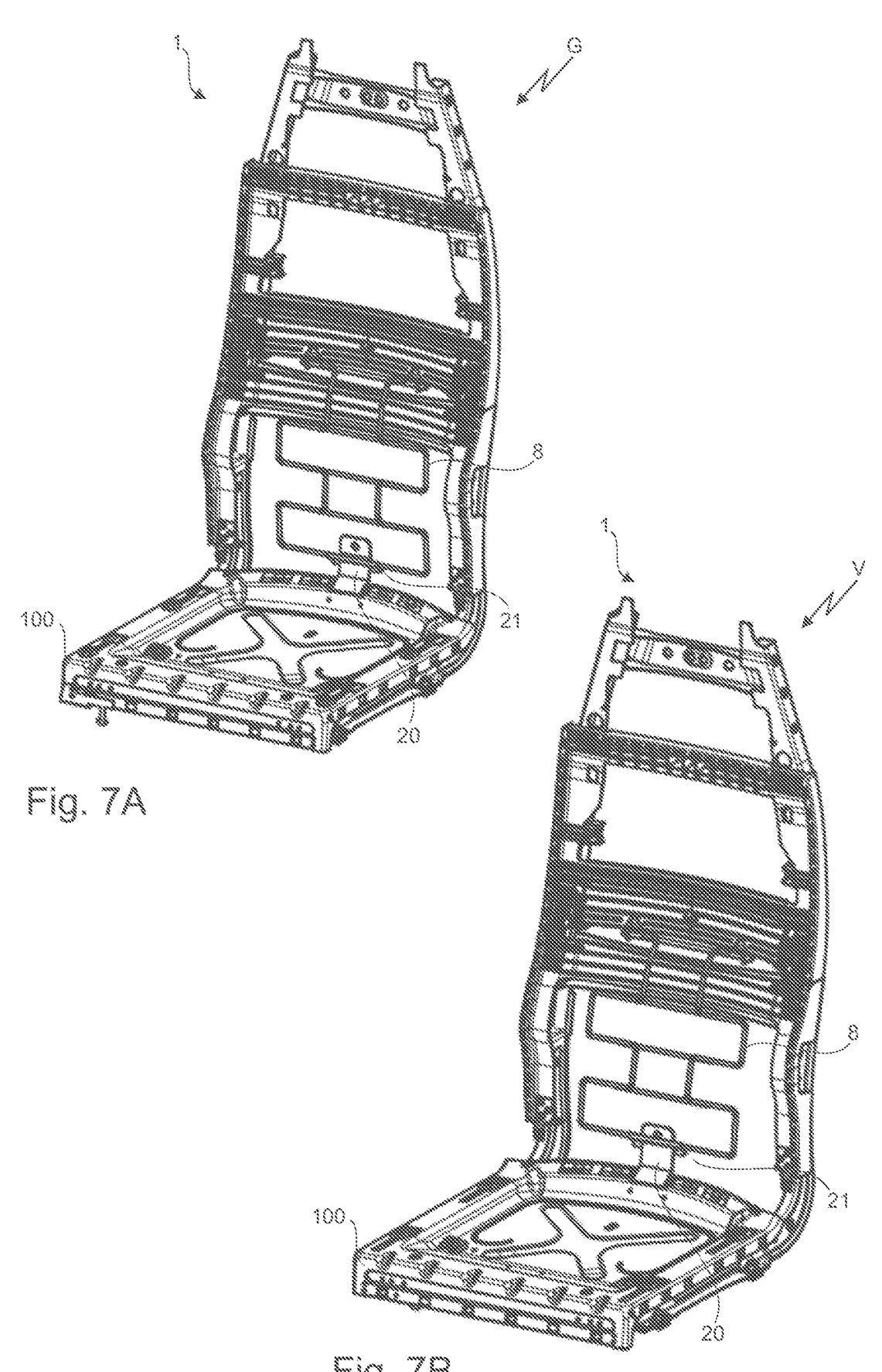
FIG. 7A-7D the vehicle seat in different positions in different representations.
Figures 7C, 7D:
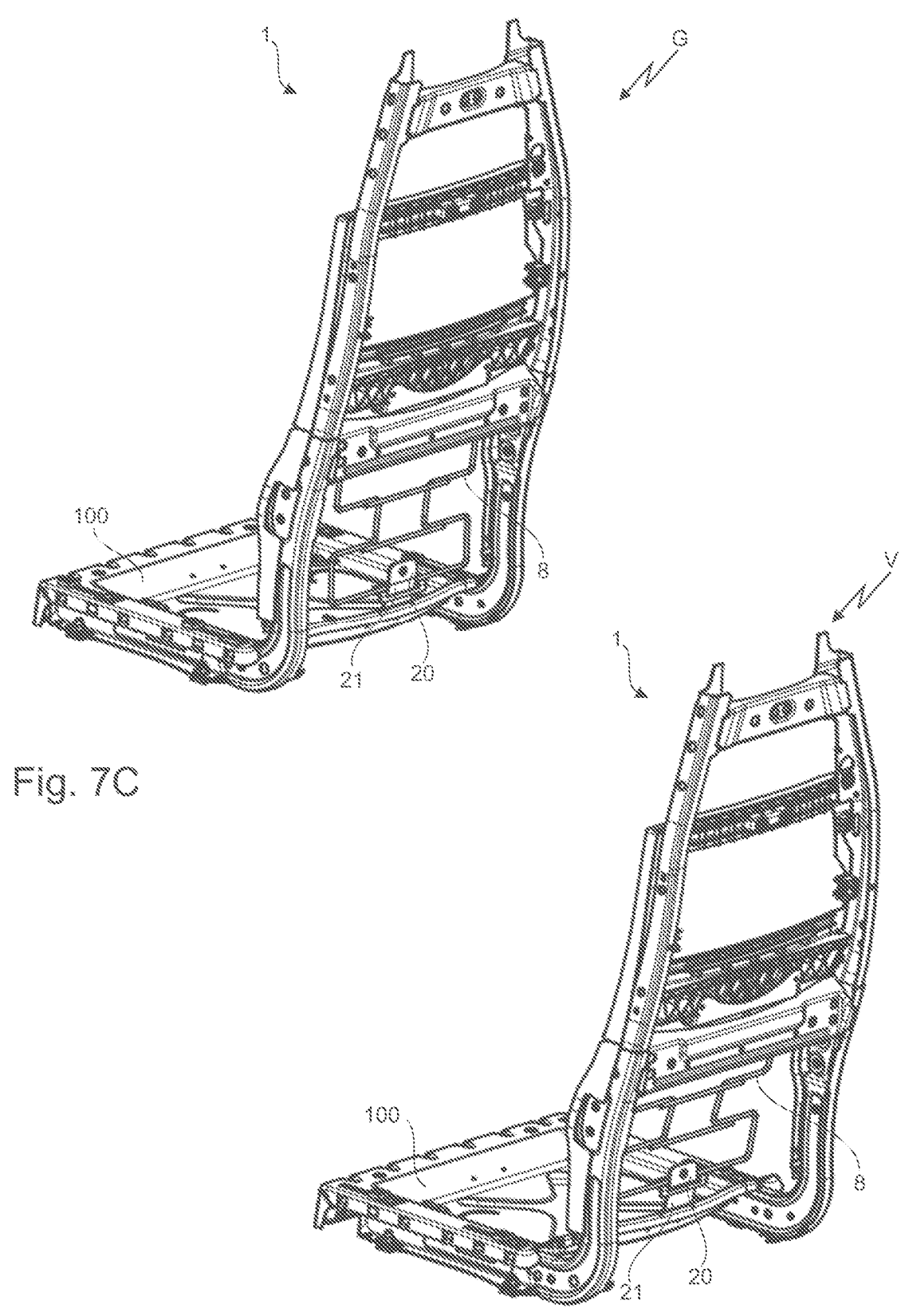

In FIGS. 7A to 7D, the movement of the seat part 100 and the corresponding movements of the connecting unit 19 with engage element 21 and driver element 20 are again shown in their entirety, wherein in FIG. 7A the vehicle seat 1 is shown in perspective view from the front in the non-displaced position G and in FIG. 7B in the displaced position V, and wherein in FIG. 7C the vehicle seat 1 is shown in perspective view from the rear in the non-displaced position G and in FIG. 7D in the displaced position V.

Figures 8A, 8B:
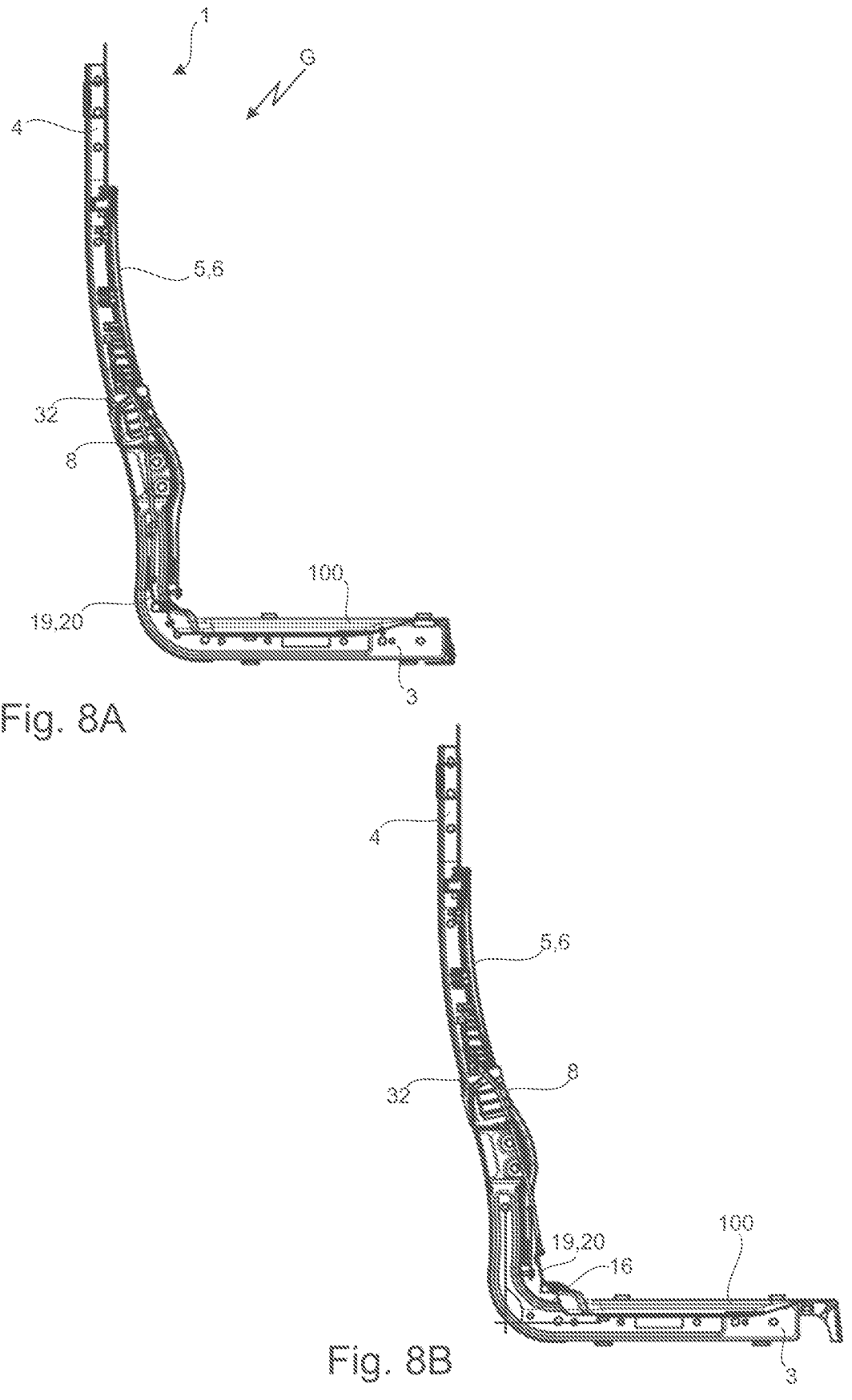
FIG. 8A-8C the vehicle seat in a sectional view in different positions.
Figure 8C:
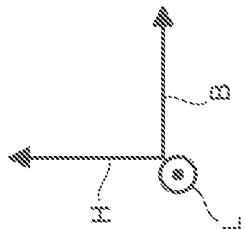

In FIG. 8A, the vehicle seat 1 is shown in a side sectional view in the non-displaced position G and in FIG. 8B in the displaced position V, and wherein in FIG. 8C the vehicle seat 1 is shown a superposition of the non-displaced position G and the displaced position V.

In the FIG. 8C, the movement of the support part 8 is particularly well visible based on the displacement of the seat part.

Further preferably, a preferred embodiment of the driver element 20 can be seen to comprise at least a first portion 41, a second portion 42 and a third portion 43. Preferably, the first section 41 is connected to the seat part 100, the second section 42 is connected to the first section 41, and the third section 43 is connected to the second section 42. Preferably, the third section 43 is disposed above the second section 42, and the second section 42 is disposed above the first section 41. Preferably, the first section 41 is arranged at a first angle 41' to the vehicle seat longitudinal direction L, the second section 42 is arranged at a second angle 42' to the vehicle seat longitudinal direction L, and the third section 43 is arranged at a third angle 43' to the vehicle seat longitudinal direction L. Preferably, the first angle 41' is smaller than the second angle 42' and the second angle 42' is smaller than the third angle 43'. Preferably, the third angle 43' is 90°.

All features disclosed in the application documents are claimed to be essential to the invention provided that they are new, individually or in combination, compared to the prior art.

REFERENCE SIGN LIST

1. Vehicle seat
2. Base frame
3. Seat part frame
4. Backrest frame
5. Backrest part
6. Upholstery frame
7. Backrest upholstery
8. Support part
9. Middle section
10. Backrest tilt angle
11. First backrest frame support
12. Second backrest frame support
13. First upholstery frame support
14. Second upholstery frame support
15. Lower section
16. Unchangeable angle
17. First cross strut
18. Second cross strut
19. Connector unit
20. Pick-up element
21. Engage element
22. Meander
23. First support part element
24. Second support part element
25. Connector element
26. Armrest
27. Headrest 28. First cover element
29. Second cover element
30. Receiving part
31. Third cross strut
32. First axis of rotation
33. Upper Section
34. Restoring connection
35. Large Opening
36. Smaller Opening
37. Retaining means
38. Connection
39. Uppermost connection element
40. Opening
41. First Section
41' First Angle
42. Second Section
42' Second angle
43. Third Section
43' Third angle
100. Seat part
L Vehicle seat longitudinal direction
B Vehicle seat width direction
H Vehicle seat height direction
G Basic position
V Displaced position
P Person
VR Displacement direction
RL Backrest
F Force

What is claimed is:

1. A vehicle seat comprising:
a base frame, which comprises a seat part frame;
a backrest frame; and
a seat part displaceable relative to the base frame,
wherein the vehicle seat further comprises a backrest part, wherein the backrest part is detachably connectable with the backrest frame and the seat part,
wherein the backrest part comprises an upholstery frame with a backrest upholstery,
wherein the upholstery frame is detachably connectable to the backrest frame,
wherein the backrest part comprises a support part that is rotatably connected to the upholstery frame about a first axis of rotation and detachably connected to the seat part, and
wherein the support part is at least partially made of an elongated wire and the support part has a plurality of meanders, so that the support part has a meandering structure.

2. The vehicle seat according to claim 1,
wherein the support part is provided and designed to deform a middle section of the backrest upholstery, the deformation being able to be brought about by means of a displacement of the seat part, wherein a backrest inclination angle is adjustable by the deformation of the middle section.

3. The vehicle seat according to claim 2,
wherein in a non-displaced position (V), a backrest inclination angle is smaller than in a displaced position (V).

4. The vehicle seat according to claim 1,
wherein the backrest frame comprises a first upwardly extending backrest frame support and a second upwardly extending backrest frame support, and wherein the upholstery frame comprises a first upwardly extending upholstery frame support and a second upwardly extending upholstery frame support, wherein the first backrest frame support and the first upholstery frame support as well as the second backrest frame support and the second upholstery frame support are fixedly connected to each other in a lower region.

5. The vehicle seat according to claim 1, wherein the seat part frame and the backrest frame enclose a fixed and unchangeable angle to each other.

6. The vehicle seat according to claim 1, wherein the upholstery frame comprises a first cross strut on which the support part is rotatably arranged.

7. The vehicle seat according to claim 1, wherein the support part is connected to the seat part by means of a connector unit, the connector unit comprising a pick-up element, which is fixedly connected to the seat part.

8. The vehicle seat according to claim 7, wherein an engage element is arranged on the support part, which engage element is intended and designed to be connected to the pick-up element.

9. The vehicle seat according to claim 1, wherein the support part is formed of a first support part element and a second support part element, the first support part element and the second support part element being connected to each other.

10. The vehicle seat according to claim 9, wherein the support part elements are connected to one another by means of at least two connecting elements.

11. The vehicle seat according to claim 1, wherein the seat part is displaceable relative to the seat part frame exclusively in translation.

12. A vehicle seat comprising:
a base frame, which comprises a seat part frame;
a backrest frame;
a seat part displaceable relative to the base frame; and
a backrest part comprising an upholstery frame,
wherein the backrest part comprises a support part that is rotatably connected to the upholstery frame about a first axis of rotation and detachably connected to the seat part,
wherein the support part is at least partially made of an elongated wire and the support part has a plurality of meanders, so that the support part has a meandering structure, and
wherein the upholstery frame comprises a first cross strut on which the support part is rotatably arranged.

13. The vehicle seat according to claim 12, wherein the support part is provided and designed to deform a middle section of the backrest upholstery, the deformation being able to be brought about by means of a displacement of the seat part, and wherein a backrest inclination angle is adjustable by the deformation of the middle section.

14. The vehicle seat according to claim 12, wherein, in a non-displaced position (V), a backrest inclination angle is smaller than in a displaced position (V).

15. The vehicle seat according to claim 12, wherein the backrest part is detachably connectable with at least one of the backrest frame and the seat part.

16. The vehicle seat according to claim 15, wherein the backrest frame comprises a first upwardly extending backrest frame support and a second upwardly extending backrest frame support, wherein the upholstery frame comprises a first upwardly extending upholstery frame support and a second upwardly extending upholstery frame support, and wherein the first backrest frame support and the first upholstery frame support as well as the second backrest frame support and the second upholstery frame support are fixedly connected to each other in a lower region.

17. The vehicle seat according to claim 12, wherein the seat part frame and the backrest frame enclose a fixed and unchangeable angle to each other, and wherein the seat part is displaceable relative to the seat part frame exclusively in translation.

18. The vehicle seat according to claim 12, wherein the support part is connected to the seat part by means of a connector unit, the connector unit comprising a pick-up element, which is fixedly connected to the seat part, and wherein an engage element is arranged on the support part, which engage element is intended and designed to be connected to the pick-up element.

19. The vehicle seat according to claim 12, wherein the support part is formed of a first support part element and a second support part element, the first support part element and the second support part element being connected to each other, and wherein the support part elements are connected to one another by means of at least two connecting elements.

* * * * *